US008612601B2

(12) United States Patent
Huang et al.

(10) Patent No.: US 8,612,601 B2
(45) Date of Patent: Dec. 17, 2013

(54) MANAGEMENT METHOD AND MANAGEMENT DEVICE FOR NETWORK ADDRESS TRANSLATION

(75) Inventors: Jing Huang, Shenzhen (CN); Min Zha, Shenzhen (CN); Xushan Lu, Shenzhen (CN); Zhongjian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 13/369,397

(22) Filed: Feb. 9, 2012

(65) Prior Publication Data

US 2012/0144043 A1    Jun. 7, 2012

Related U.S. Application Data

(63) Continuation of application No. PCT/CN2011/073625, filed on May 3, 2011.

(30) Foreign Application Priority Data

Aug. 19, 2010   (CN) .......................... 2010 1 0257316

(51) Int. Cl.
*G06F 15/173*   (2006.01)
(52) U.S. Cl.
USPC ........... 709/226; 709/223; 709/224; 709/220; 709/221; 709/203; 370/352; 370/329
(58) Field of Classification Search
USPC .......... 709/223–226, 220–221, 203; 370/352, 370/329
See application file for complete search history.

(56) References Cited

U.S. PATENT DOCUMENTS

| | | | | |
|---|---|---|---|---|
| 8,281,377 | B1 * | 10/2012 | Snow et al. | 726/7 |
| 2007/0019623 | A1 * | 1/2007 | Alt et al. | 370/352 |
| 2007/0199062 | A1 * | 8/2007 | Cho | 726/12 |

FOREIGN PATENT DOCUMENTS

| | | |
|---|---|---|
| CN | 101136797 | 3/2008 |
| CN | 101217574 | 7/2008 |
| CN | 101262506 | 9/2008 |
| CN | 101945140 | 1/2011 |
| JP | 2007-074172 | 3/2007 |
| JP | 2009-267522 | 11/2009 |
| JP | 2010-057028 A | 3/2010 |
| JP | 2010057028 A * | 3/2010 |

OTHER PUBLICATIONS

Yamagata, I., et al. "Common Requirements for IP Address Sharing Schemes", Internet Engineering Task Force, Internet-Draft, Jul. 12, 2010.*

(Continued)

*Primary Examiner* — Wing F Chan
*Assistant Examiner* — Benjamin M Thieu
(74) *Attorney, Agent, or Firm* — Brinks Gilson & Lione

(57) ABSTRACT

A management method for network address translation includes: obtaining a network resource section of a client and using state information of the network resource section; adjusting the network resource section according to the using state information of the network resource section, where the adjusted network resource section can provide a network resource for all connections of the client; establishing a network address translation entry for each connection of the client according to the adjusted network resource section; and establishing a corresponding log record for the network resource section.

6 Claims, 3 Drawing Sheets

(56) References Cited

OTHER PUBLICATIONS

Brockners, F., et al. "Review of NAT Control Procotols", Diameter Maintenance and Extensions, Internet-Draft, Jul. 3, 2009.*
Brockners, F., et al. "Diameter NAT Control Applications", Internet Engineering Task Force, Internet Draft, Oct. 23, 2009.*
PCT International Search Report mailed Aug. 11, 2011, issued in related International Application No. PCT/CN2011/073625, Huawei Technologies Co., Ltd. (3 pages).
EPO Extended Search Report mailed Jul. 5, 2012, issued in related European Application No. EP11802839.8, Huawei Technologies Co., Ltd. (7 pages).
Brockners, F., et al. "Review of NAT Control Protocols", *Diameter Maintenance and Extensions*, Internet-Draft, Jul. 3, 2009 (21 pages).
Brockners, F., et al. "Diameter NAT Control Application", *Internet Engineering Task Force*, Internet Draft, Oct. 23, 2009 (40 pages).
Durand, A., et al. "Dual-Stack Lite Broadband Deployments Following IPv4 Exhaustion", *Internet Engineering Task Force*, Internet-Draft, Aug. 11, 2010 (31 pages).
Tsou, T., et al. "Port Management to Reduce Logging in Large-Scale NATs", *Internet Engineering Task Force*, Internet-Draft, Aug. 24, 2010 (5 pages).
Yamagata, I., et al. "Common Requirements for IP Address Sharing Schemes", *Internet Engineering Task Force*, Internet-Draft, Jul. 12, 2010 (20 pages).
Office Action issued in corresponding Japanese Patent Application No. 2012-529116, mailed Jun. 4, 2013, 4 pages.
Office Action issued in corresponding Korean Patent Application No. 10-2012-7001554, mailed Jun. 18, 2013, 7 pages.
Written Opinion of the International Searching Authority issued in corresponding PCT Patent Application No. PCT/CN2011/073625, mailed Aug. 11, 2011, 6 pages.

* cited by examiner

MANAGEMENT METHOD AND MANAGEMENT DEVICE FOR NETWORK ADDRESS TRANSLATION

CROSS-REFERENCE TO RELATED APPLICATIONS

This application is a continuation of International Application No. PCT/CN2011/073625, filed on May 3, 2011, which claims priority to Chinese Patent Application No. 201010257316.0, filed on Aug. 19, 2010, both of which are hereby incorporated by reference in their entireties.

FIELD OF THE INVENTION

The present invention relates to the field of communications technologies, and in particular, to a management method and a management device for network address translation.

BACKGROUND OF THE INVENTION

An NAT (network address translation) device performs translation on a source IP (Internet Protocol, Internet Protocol) address and a source port of a packet. With this technology, translation from a private network address/port to a public address/port may be realized, and translation between an IPv4 (Internet Protocol Version 4, Internet Protocol Version 4) packet and an IPv6 (Internet Protocol Version 6, Internet Protocol Version 6) packet may also be realized. For example, when the NAT realizes translation from IPv4 to Ipv6, NAT entries need to be established for different connections of different client PCs (Personal Computer, personal computer), so that different client PCs share one public IP address, and each connection uses a port number of a different public IP.

Currently, in order to solve a problem of shortage of IPv4 public network addresses, an operator can introduce and deploy NAT equipment in the operator's network. A server at an operator side needs to provide a network service for a large number of users, and therefore, a large number of connections need to be established between users and the server. Especially, some network applications adopt a technology such as Ajax, so that when a user requests for a network application adopting technologies such as an asynchronous JavaScript and eXtensible Markup Language (eXtensible Markup Language, XML) (Asynchronous JavaScript and XML, AJAX), dozens of, hundreds of, or even more TCP (Transmission Control Protocol, transmission control protocol) connections are generated. Because of the foregoing requirement, NAT equipment with high performance often can support dozens of mega of NAT entries, and can newly establish 1-2 M or even more NAT entries per second. In order to monitor a client correctly, the operator generally needs to generate one piece of log record information for every NAT entry, and each piece of log record information needs to occupy dozens of bytes. In this way, a data stream of log record information that needs to be generated by one piece of NAT equipment with high performance per second may be as high as dozens of or even hundreds of megabytes. In this way, a load that the NAT equipment generates log record information is heavy, and furthermore, a requirement on performance of a server that is used for storing the log record information and a requirement on a storage space are increased accordingly.

SUMMARY OF THE INVENTION

Embodiments of the present invention provide a management method and a management device for network address translation.

In order to achieve the forgoing object, the embodiments of the present invention adopt the following technical solutions:

In an aspect, an embodiment of the present invention provides a management method for network address translation, where the method includes:

obtaining a network resource section of a client and using state information of the network resource section;

adjusting the network resource section according to the using state information of the network resource section, where the adjusted network resource section can provide a network resource for all connections of the client;

respectively establishing a network address translation entry for each connection of the client according to the adjusted network resource section; and establishing a corresponding log record for the network resource section.

In another aspect, an embodiment of the present invention provides a management device for network address translation, where the device includes:

an information obtaining unit, configured to obtain a network resource section of a client and using state information of the network resource section;

a resource adjusting unit, configured to adjust the network resource section according to the using state information of the network resource section, where the adjusted network resource section can provide a network resource for all connections of the client;

an entry establishing unit, configured to respectively establish a network address translation entry for each connection of the client according to the adjusted network resource section; and a log establishing unit, configured to establish a corresponding log record for the network resource section.

With the management method and management device for network address translation that are provided in the embodiments of the present invention, a network resource section of a client and using state information of the network resource section are obtained, and the network resource section is adjusted according to the using state information of the network resource section, where the adjusted network resource section can provide a network resource for all connections of the client. A network address translation entry is respectively established for each connection of the client according to the adjusted network resource section, and a corresponding log record is established for the network resource section. In some embodiments of the present invention, a log record is established for each connection of the client according to the network resource section rather than is established one by one according to the network address translation entry that is established by each connection of the client, thus reducing the establishment number of log records, and reducing a load that NAT equipment generates log record information. At the same time, establishment data of the log record is reduced, so that a storage space of a log record server is saved, and therefore, a requirement on performance of a log record storage server is also reduced accordingly.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present inven

DETAILED DESCRIPTION OF THE EMBODIMENTS

A specific implementation process of the present invention is described by taking examples through embodiments in the following. Apparently, the embodiments to be described are a part rather than all of the embodiments of the present invention. Based on the embodiments of the present invention, all other embodiments obtained by persons skilled in the art without creative efforts shall fall within the protection scope of the present invention.

Figure 1:
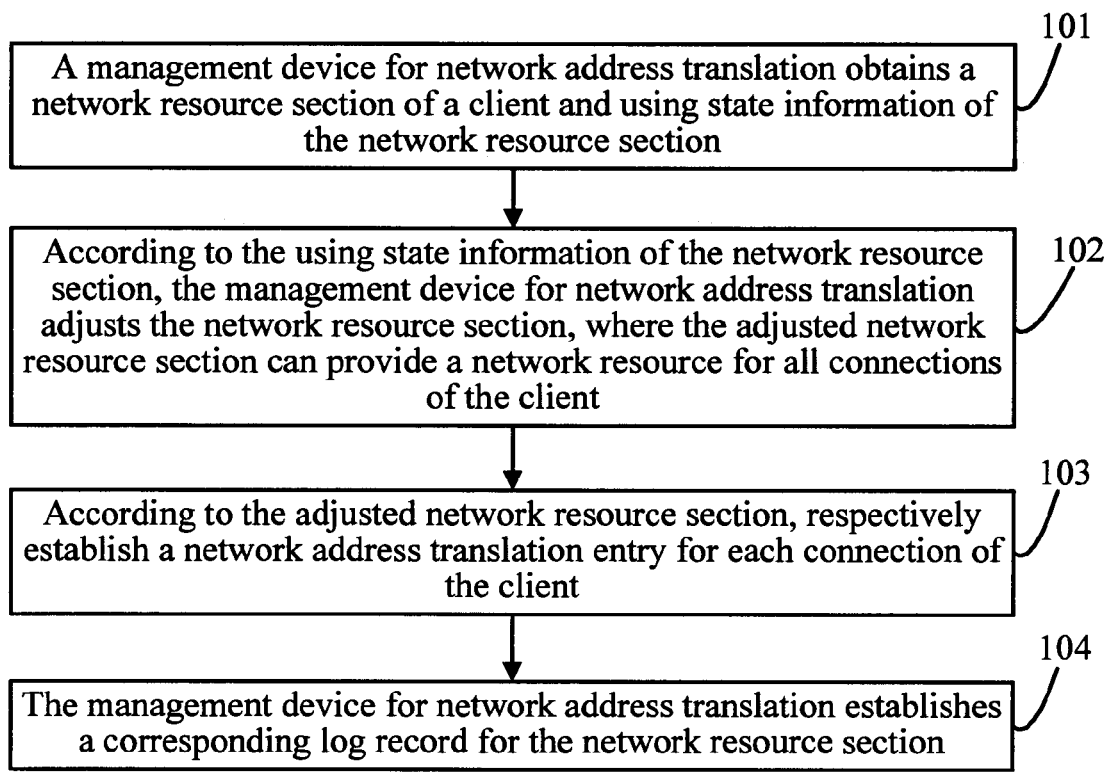
- FIG. 1 is a flow chart of a management method for network address translation according to an embodiment of the present invention.

As shown in FIG. 1, an embodiment of the present invention provides a management method for network address translation, where the method includes:

101: A management device for network address translation obtains a network resource section of a client and using state information of the network resource section.

102: According to the using state information of the network resource section, the management device for network address translation adjusts the network resource section, where the adjusted network resource section can provide a network resource for all connections of the client. For example, the using state information of the network resource section includes: an occupancy rate of the network resource section or an idleness rate of the network resource section, and when the occupancy rate of the network resource section is greater than or equal to a preset occupancy threshold or the idleness rate of the network resource section is smaller than a preset idleness threshold, the management device for network address translation adds a network resource section of the client; or the using state information of the network resource section includes: the number of idle network resource sections, and when the number of the idle network resource sections is smaller than or equal to a preset idle number threshold, a network resource section of the client is added; or the using state information of the network resource section includes: duration in which a network resource section is not used, and when the duration in which the network resource section is not used is greater than a preset idle time threshold, the network resource section is released.

103: According to the adjusted network resource section, respectively establish a network address translation entry for each connection of the client.

104: The management device for network address translation establishes a corresponding log record for the network resource section. For example, when the adjusted network resource section is two network resource sections, the management device for network address translation respectively establishes one log record for each of the two network resource sections. When the management device for network address translation releases one of the network resource sections, the log record corresponding to the network resource section is sent to a log record storage server.

The network resource section may be an available port range after NAT translation, for example, ports with a section of continuous serial numbers, that is, a port block (block), or a plurality of ports with discontinuous serial numbers. When the management device for network address translation has a plurality of available IP addresses, the network resource section may further include an IP address corresponding to the port range.

The using state information of the network resource section may include one or more kinds of the following: the occupancy rate of the network resource section, the idleness rate of the network resource section, the number of idle network resource sections, and the duration in which a network resource section is not used.

The log record includes at least a user identity, and in addition, may further include one or more kinds of the following: start time for using the network resource section, release time of the network resource section, a network IP, and the port range.

Figure 2:
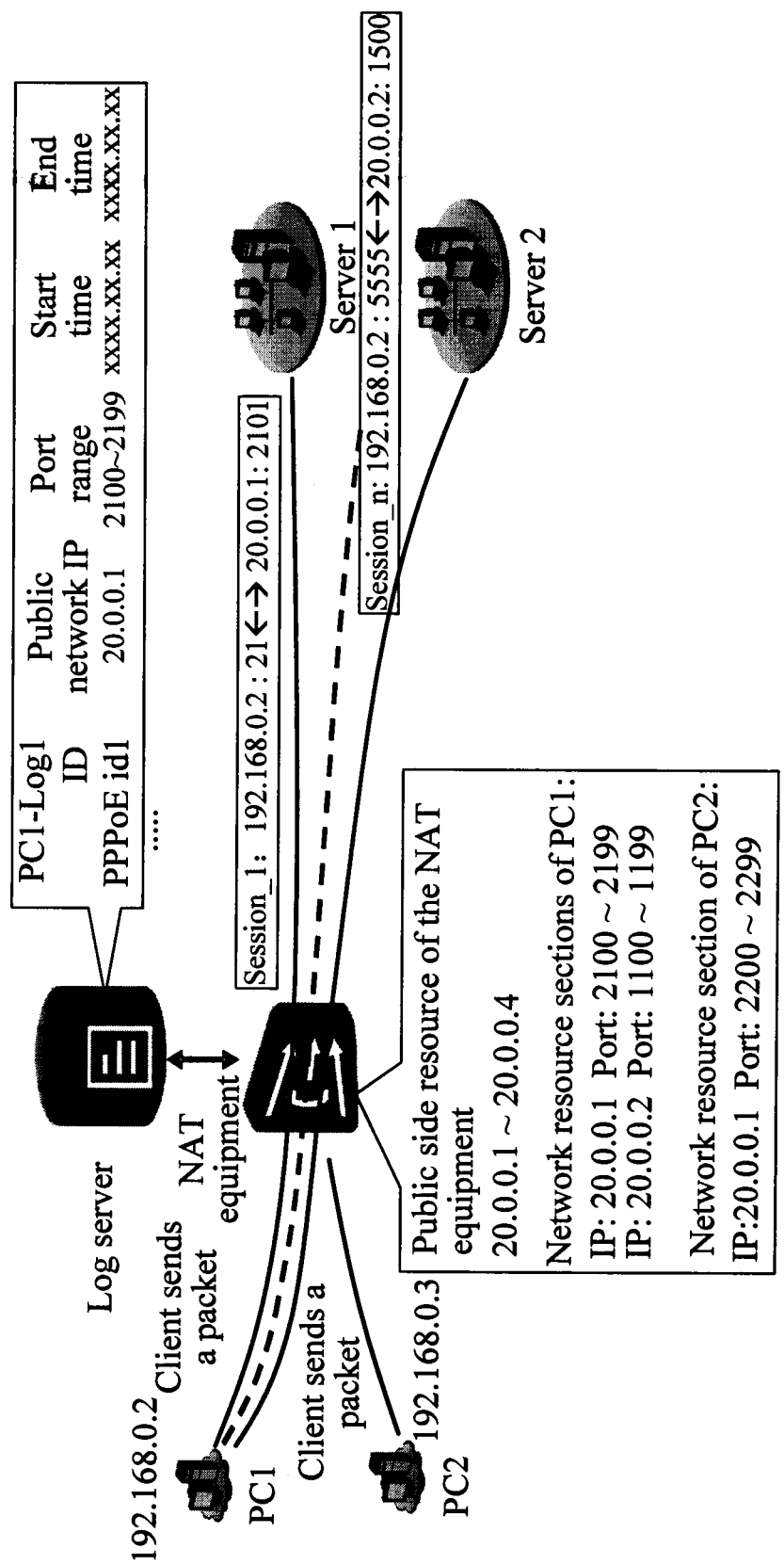
FIG. 2 is a flow chart of another management method for network address translation according to an embodiment of the present invention.

In some embodiments, the management device for network address translation is disposed in NAT equipment, a client PC1 has been allocated with a network resource section which is specifically a port number port: 2100-2199, and is corresponding to a public IP address 20.0.0.1. As shown in FIG. 2, a specific implementation process of a management method for network address translation according to the present invention is as follows:

Step 1: NAT equipment receives a packet sent by the client, and the packet carries a user identity, where the user identity may be multiple types of possible content, for example, may be a PPPoE (Point-to-Point Protocol over Ethernet session, point-to-point protocol over Ethernet session) ID, a tunnel ID, and may also be a VLAN (Virtual Local Area Network, virtual local area network) ID or a private network side IP, which may be selected and defined according to an actual requirement.

Step 2: According to the user identity, judge whether the client has been allocated with a network resource section. For example, according to a user identity PC1 or PC2 of the client, it may be judged whether the clients PC1 and PC2 have been allocated with network resource sections. For example, if the PC1 has been allocated with the network resource section, continue to perform step 3; and if the PC2 has not been allocated with the network resource section, perform step 4.

Step 3: If the client has been allocated with the network resource section, respectively establish a network address translation entry for each connection of the client according to the network resource section, and perform packet forwarding according to the entry. When a network address translation table has an address and a port of the packet that is sent by the client, the NAT equipment translates the packet directly according to the network address translation table. When the network address translation table does not have the address and the port of the packet that is sent by the client, select a port from the network resource section for a connection that is corresponding to the packet, and establish a new network address translation entry. For example: the client PC1 has been allocated with the network resource section, the client PC1 sends a packet 1 to a server (Server) 1, and a port 2101 is selected from the allocated network resource section, so as to establish a network address translation entry Session_1 for a connection between the PC1 and the Server 1:

Session_1: 192.168.0.2:21 20.0.0.1:2101.

In this way, when the client PC1 sends a packet 2 that has the same IP address and port information as those of the packet 1 to the Server 1 again, packet forwarding may be performed according to the network address translation entry Session_1, and when a packet with the port 2101 is received, where the packet with the port 2011 is sent by the Server 1 to the client PC1, according to the network address translation entry Session_1, the packet of the Server 1 may be forwarded to the client PC1 correctly as well. However, when the client PC1 needs to send a new packet to a Server 2, a new connection (that is, a connection between the PC1 and the Server 2) needs to be established, so as to perform packet forwarding, and at this time, continue to perform step 5.

Step 4: If the client has not been allocated with the network resource section, allocate a network resource section for the client. For example, the client PC2 has not been allocated with the network resource section, and the NAT equipment allocates one or more network resource sections for the client PC2, for example, a port number port: 2200-2299, and a corresponding public IP address 20.0.0.1.

Step 5: The NAT equipment obtains a network resource section of the client PC1 and using state information of the network resource section.

Step 6: According to the using state information of the network resource section, adjust the network resource section, where the adjusted network resource section can provide a network resource for all connections of the client. This step may include:

Obtain an occupancy rate threshold of the network resource section, where the occupancy rate threshold may be preset, and may also be adjusted according to an actual situation. Judge whether an occupancy rate of the network resource section is greater than or equal to the occupancy rate threshold of the network resource section, that is, judge whether the network resource section cannot satisfy a requirement of the new connection. If the occupancy rate of the network resource section is greater than or equal to the occupancy rate threshold of the network resource section, add a network resource section of the client. For example, the occupancy rate threshold is 90%. The client PC1 has been allocated with three network resource sections, the three network resource sections totally include 300 ports, and the client PC1 has used resources of 270 ports, so that the occupancy rate of the network resource section is 90%, which is equal to the occupancy rate threshold, and therefore, one or more network resource sections are allocated for the PC1 additionally. In the preceding judging manner, a total occupancy rate of the network resource sections may also be combined with an occupancy rate of each network resource section. For example, only when the total occupancy rate of the network resource sections is greater than or equal to 90%, and occupancy rates of each network resource section are all greater than or equal to 50%, a network resource section of the client is added. The occupancy rate threshold may be any value that is greater than 0 and smaller than or equal to 100%. When the occupancy rate threshold is 100%, a new network resource section is allocated only in the case that all allocated network resource sections have been used. Persons of ordinary skill in the art may understand that, the occupancy rate and the occupancy rate threshold of the network resource section may also be replaced by an idleness rate and an idleness rate threshold of the network resource section.

The number of idle network resource sections may also be used as a standard for judging whether to add a network resource section of the client. For example, a preset idle number threshold is 40, the client PC1 has been allocated with three network resource sections, the three network resource sections totally include 300 ports, and the client PC1 has used resources of 270 ports, so that the number of idle network resource sections is 30, which is smaller than or equal to the preset idle number threshold, and therefore, a network resource section of the client is added. The idle number threshold may be any natural number. When the idle number threshold is 0, a new network resource section is allocated only in the case that all the allocated network resource sections have been used.

Step 6 may further include:

when duration in which a network resource section is not used is greater than a preset idle time threshold, release the network resource section. For example, a timing value of a timer is 5 minutes, the client PC1 has been allocated with three network resource sections, and one of the network resource sections is not used by a user within 5 minutes, release the network resource section, so that the network resource section is allocated to another client to use.

Step 7: According to the adjusted network resource section, respectively establish a network address translation entry for each connection of the client. For example, according to a fact that the third network resource section is a connection between the client PC1 and the Server 2, establish a network address translation entry Session_n;

Session_n: 192.168.0.2:5555 20.0.0.2:1500

Step 8: Establish a corresponding log record for the network resource section.

Step 9: When one network resource section is released, send a log record that is corresponding to the network resource section to a log record storage server. For example, when the first network resource section is released, a log record PC1-Log1 corresponding to the first network resource section is sent to the log record storage server. The log record PC1-Log1 includes: a user identity (PPPoE id1), a public network IP (pubic IP) (20.0.0.1), a port range (2100-2199), start time of the network resource section (start time) (xxxx.xx.xx), and end time of the network resource section (end time) (xxxx.xx.xx).

The network resource section mentioned in the embodiments of the present invention may include multiple different kinds of content according to an actual situation, for example, the network resource section may be an IPv4 public network address and a corresponding TCP or UDP port section, which is a common situation; and may also be a private IP and a corresponding port section; and may also be an IPv6 address.n The size of the network resource section may be pre-configured, for example, if the number of ports that are pre-configured on the network resource section is 200, an allocated network resource section includes 200 ports, and when an allocated client needs to be adjusted, the size of an added or reduced network resource section each time may also be configured, for example, 50 ports or 100 ports may be increased each time, which is not limited to specific data given in this specification.

Figure 3:
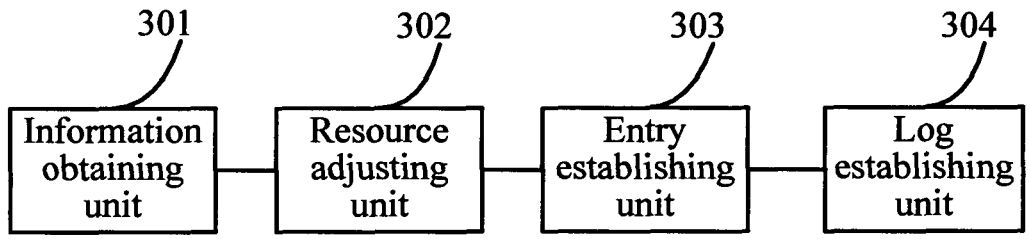
FIG. 3 is a schematic structural diagram of a management device for network address translation according to the present invention.

As shown in FIG. 3, an embodiment of the present invention provides a management device for network address translation, where the device includes:

an information obtaining unit 301, configured to obtain a network resource section of a client and using state information of the network resource section, where the client includes at least one network resource section, and the network resource section includes: a port range, or a port range and an IP address that is corresponding to the port range.

a resource adjusting unit 302, configured to adjust the network resource section according to the using state information of the network resource section, where the adjusted network resource section can provide a network resource for all connections of the client. For example, when the network resource section (that is, a first network resource section) cannot satisfy the number of connections that need to be established by a client 1, the management device for network address translation allocates another network resource section (that is, a second network resource section) for the client 1 according to a preset adjustment rule, and in this way, it may be ensured that connections of the client 1 all adopt the network resource section as described.

an entry establishing unit 303, configured to respectively establish a network address translation entry for each connection of the client according to the adjusted network resource section. For example, the adjusted network resource section includes two network resource sections (that is, the first network resource section and the second network resource section), and the management device for network address translation respectively establish a corresponding network address translation entry for each connection in the first network resource section and the second network resource section of the client 1.

a log establishing unit 304, configured to establish a corresponding log record for the network resource section.

The device may further include:

a log sending unit, configured to, when one network resource section is released, send a log record that is corresponding to the network resource section to a log record storage server.

Figure 4:
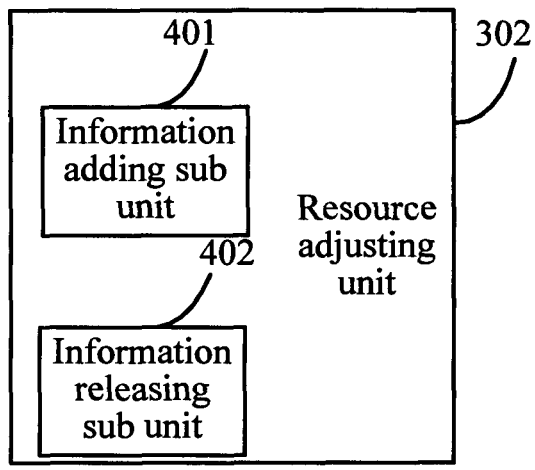
FIG. 4 is a schematic structural diagram of a resource adjusting unit 302 in a management device for network address translation according to the present invention.

The using state information of the network resource section includes: an occupancy rate of the network resource section or an idleness rate of the network resource section, and as shown in FIG. 4, the resource adjusting unit 302 may specifically include:

an information adding sub unit 401, configured to, when the occupancy rate of the network resource section is greater than or equal to a preset occupancy rate threshold or the idleness rate of the network resource section is smaller than a preset idleness rate threshold, add a network resource section of the client.

Alternatively, the using state information of the network resource section includes: the number of idle network resource sections, and the resource adjusting unit 302 may specifically include:

the information adding sub unit 401, further configured to, when the number of idle network resource sections is smaller than or equal to a preset idle number threshold, add a network resource section of the client.

The using state information of the network resource section includes: duration in which a network resource section is not used, and the resource adjusting unit 302 may specifically further include:

an information releasing sub unit 402, configured to, when the duration in which the network resource section is not used is greater than a preset idle time threshold, release the network resource section.

Figure 5:
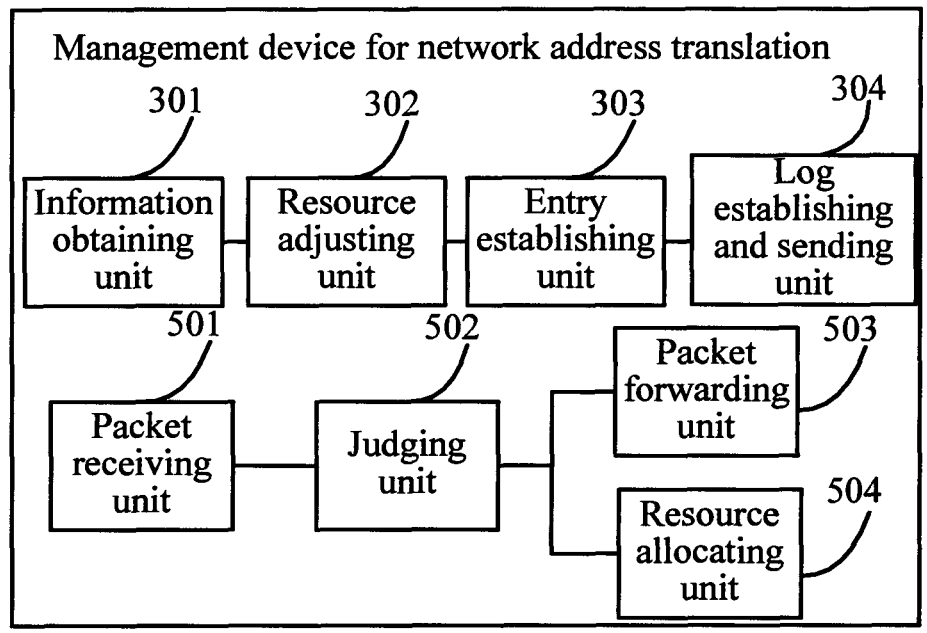
FIG. 5 is a schematic structural diagram of another management device for network address translation according to an embodiment of the present invention.

As shown in FIG. 5, the management device for network address translation may further include:

a packet receiving unit 501, configured to receive a packet sent by the client, where the packet carries a user identity;

a judging unit 502, configured to, according to the user identity, judge whether the client has been allocated with a network resource section;

a packet forwarding unit 503, configured to, if the client has been allocated with the network resource section, respectively establish a network address translation entry for each connection of the client according to the network resource section, and perform packet forwarding according to the entry; and a resource allocating unit 504, configured to, if the client has not been allocated with a network resource section, allocate a network resource section for the client.

With the management method and management device that are provided in the embodiments of the present invention, a network resource section of a client and using state information of the network resource section are obtained, and the network resource section is adjusted according to the using state information of the network resource section, where the adjusted network resource section can provide a network resource for all connections of the client. A network resource translation entry is established for each connection of the client according to the adjusted network resource section, and a corresponding log record is established for the network resource section. In the embodiments of the present invention, a log record is established for each connection of the client according to the network resource section rather than is established one by one according to the network address translation entry that is established by each connection of the client, thus reducing the establishment number of log records, and reducing a requirement on performance of NAT equipment and a cost for a network side to deploy the NAT equipment. At the same time, establishment data of the log record is reduced, so that a storage space of a log record server is saved, and therefore, a requirement on performance of a log record storage server is also reduced accordingly.

Through the preceding descriptions of the embodiments, persons skilled in the art may clearly understand that the present invention may be accomplished by software plus a necessary hardware platform, and definitely may also be accomplished by hardware, but in most cases, the former is a preferred implementation manner. Based on this understanding, all or part of the contribution made by the technical solutions of the present invention to the background technology may be embodied in the form of a software product, and the software product may be used to execute the procedure of the foregoing method. The computer software product may be stored in a storage medium, for example, an ROM/RAM, a magnetic disk, or an optical disk, and includes several instructions used to instruct a piece of computer equipment (may be a personal computer, a server, or network equipment) to perform the method described in each embodiment or in some parts of the embodiments of the present invention.

The foregoing descriptions are merely exemplary specific implementation manners of the present invention, but are not intended to limit the protection scope of the present invention. Variations or replacements that may be easily thought out by persons skilled in the art without departing from the technical scope disclosed by the present invention shall all fall within the protection scope of the present invention. Therefore, the protection scope of the present invention shall be subject to the protection scope of the appended claims.

What is claimed is:

1. A management method for network address translation, comprising:

obtaining, by a management device for network address translation, a network resource section of a client and using state information of the network resource section;

wherein the network resource section comprises a port range, or the network resource section comprises a port range and an IP address that is corresponding to the port range;

wherein using state information of the network resource section comprises one of: an occupancy rate of the port range, an idleness rate of the port range, a number of idle ports in the port range;

adjusting, by the management device for network address translation, the port range in the network resource section according to the using state information of the network resource section, wherein the adjusted network resource section can provide a network resource for all connections of the client;

respectively establishing, by the management device for network address translation, a network address translation entry for each of the connection of the client according to the adjusted network resource section; and establishing, by the management device for network address translation, a corresponding log record for the network resource section;

wherein adjusting the network resource section according to the using state information of the network resource section comprises:

if the occupancy rate of the port range is greater than or equal to a preset occupancy rate threshold or the idleness rate of the port range is smaller than a preset idleness rate threshold, adding a new port range into the network resource section of the client; or if the number of idle ports in the port range is smaller than or equal to a preset idle number threshold, adding a new port range into the network resource section of the client.

2. The management method for network address translation according to claim 1, wherein the log record comprises at least a user identity, and the method further comprises:

when one network resource section is released, sending a log record that is corresponding to the network resource section to a log record storage server.

3. The management method for network address translation according to claim 1, further comprising:

receiving a packet sent by the client, wherein the packet carries a user identity;

according to the user identity, judging whether the client has been allocated with a network resource section;

if the client has been allocated with the network resource section, respectively establishing a network address translation entry for each connection of the client according to the network resource section, and performing packet forwarding according to the entry; and if the client has not been allocated with the network resource section, allocating a network resource section for the client.

4. A management device for network address translation, comprising:

a processor and a non-transitory storage medium configure to store:

an information obtaining unit, configured to obtain a network resource section of a client and using state information of the network resource section, wherein the network resource section comprises a port range, or the network resource section comprises a port range and an IP address that is corresponding to the port range, and the using state information of the network resource section comprises one of: an occupancy rate of the port range, an idleness rate of the port range, and a number of idle ports in the port range;

a resource adjusting unit, configured to adjust the port range in the network resource section according to the using state information of the network resource section, wherein the adjusted network resource section can provide a network resource for all connections of the client;

an entry establishing unit, configured to respectively establish a network address translation entry for each connection of the client according to the adjusted network resource section; and a log establishing unit, configured to establish a corresponding log record for the network resource section;

wherein the resource adjusting unit comprises an information adding sub unit, configured to:

if the occupancy rate of the port range is greater than or equal to a preset occupancy rate threshold or the idleness rate of the port range is smaller than a preset idleness rate threshold, add a new port range into the network resource section of the client; or if the number of idle ports in the port range is smaller than or equal to a preset idle number threshold, add a new port range into the network resource section of the client.

5. The management device for network address translation according to claim 4, wherein the log record comprises at least a user identity, and the non-transitory storage medium further configure to store:

a log sending unit, configured to, when one network resource section is released, send a log record that is corresponding to the network resource section to a log record storage server.

6. The management device for network address translation according to claim 4, wherein the non-transitory storage medium further configure to store:

a packet receiving unit, configured to receive a packet sent by the client, wherein the packet carries a user identity;

a judging unit, configured to, according to the user identity, judge whether the client has been allocated with a network resource section;

a packet forwarding unit, configured to, if the client has been allocated with the network resource section, respectively establish a network address translation entry for each connection of the client according to the network resource section, and perform packet forwarding according to the entry; and a resource allocating unit, configured to, if the client has not been allocated with a network resource section, allocate a network resource section for the client.

* * * * *